United States Patent
Munakata et al.

[11] Patent Number: 5,808,238
[45] Date of Patent: Sep. 15, 1998

[54] MULTIPLE-CABLE POWER FOR TRANSMISSION LINE SYSTEM

[75] Inventors: Takeo Munakata; Jun Katoh; Takashi Shinohara, all of Nikko, Japan

[73] Assignee: The Furukawa Electric Co., Ltd., Tokyo, Japan

[21] Appl. No.: 752,397

[22] Filed: Nov. 20, 1996

[30] Foreign Application Priority Data

Nov. 24, 1995 [JP] Japan ................................. 7-305744

[51] Int. Cl.⁶ ........................................................ H02G 7/14
[52] U.S. Cl. ........................ 174/42; 174/127; 174/128.1; 174/117 R
[58] Field of Search ............................. 174/128.1, 128.2, 174/127, 129 R, 117 R, 42, 40 R

[56] References Cited

FOREIGN PATENT DOCUMENTS

| 1 038 881 | 9/1978 | Canada . | |
|---|---|---|---|
| 49-101876 | 7/1974 | Japan . | |
| 50-96603 | 7/1975 | Japan . | |
| 2311119 | 12/1990 | Japan | 174/128.2 X |
| 4104404 | 4/1992 | Japan | 174/128.1 X |
| 4126306 | 4/1992 | Japan | 174/128.1 X |
| 4253107 | 9/1992 | Japan | 174/128.1 X |
| 4253108 | 9/1992 | Japan | 174/128.1 X |

OTHER PUBLICATIONS

Derwent English–language Abstract of SU–1415–235–A.
Patent Abstracts of Japan, vol. 16, No. 389 (E–1250), Aug. 19, 1992 & JP 04 126306 A (Furukawa Electric Co., Ltd.), Apr. 27, 1992.
Patent Abstracts of Japan, vol. 15, No. 250 (E–1082), Jun. 26, 1991 & JP 03 078413 A (Hitachi Cable Ltd.), Apr. 3, 1991.

*Primary Examiner*—Dean A. Reichard
*Attorney, Agent, or Firm*—Frishauf, Holtz, Goodman, Langer & Chick

[57] ABSTRACT

A multiple-cable power transmission line system is provided which includes a plurality of overhead transmission lines each having a ridge on the outer periphery thereof. When the outer periphery-to-crest height of the ridge of an overhead transmission line which is located closer to the earth ground is $L_E$ and the outer periphery-to-crest height of the ridges of the other overhead transmission lines is $L_{OT}$, the relation $L_E < L_{OT}$ is fulfilled.

5 Claims, 5 Drawing Sheets

MULTIPLE-CABLE POWER FOR TRANSMISSION LINE SYSTEM

BACKGROUND OF THE INVENTION

1. Field of the Invention

The present invention relates to a multiple-cable power transmission line system designed to reduce noise caused by wind and to suppress the generation of audible noise induced by corona discharge.

2. Description of the Related Art

To reduce noise caused by wind, it is conventionally known to wind a spiral rod around the outer periphery of an overhead transmission line (see Unexamined Japanese Patent Publication (KOKAI) No. 49-101876). Also known is an overhead transmission line which, instead of having a spiral rod wound around the outer periphery, uses ridging wires twined to form its outermost layer (see Unexamined Japanese Patent Publication (KOKAI) No. 50-96603).

A plurality of such transmission lines, for example, four transmission lines, are extended to thereby constitute a multiple-cable power transmission line system.

In a multiple-cable power transmission line system including a plurality of overhead transmission lines each having a ridge on its outer periphery, the heights of the ridges of the individual overhead transmission lines are set to an identical value most suited to prevent noise from being caused by wind.

However, since each overhead transmission line of the multiple-cable power transmission line system has a ridge on its outer periphery, corona discharge is liable to occur at the ridges of overhead transmission lines located closer to the earth ground, thereby causing the possibility of radio interference etc.

SUMMARY OF THE INVENTION

An object of the present invention is to provide a multiple-cable power transmission line system capable of suppressing the occurrence of corona discharge at the ridges of overhead transmission lines located closer to the earth ground.

To achieve the above object, according to a first aspect of the invention there is provided a multiple-cable power transmission line system including a plurality of overhead transmission lines each having a ridge on an outer periphery thereof, wherein the relation $L_E < L_{OT}$ is fulfilled, where $L_E$ is an outer periphery-to-crest height of the ridge of an overhead transmission line which is located closer to the earth ground, and $L_{OT}$ is an outer periphery-to-crest height of the ridge of another overhead transmission line.

In this multiple-cable power transmission line system, preferably the outer periphery-to-crest heights $L_E$ and $L_{OT}$ of the ridges satisfy the relation $0.1 < L_E/L_{OT} < 1.0$.

According to a second aspect of the invention there is provided a multiple-cable power transmission line system including a plurality of overhead transmission lines each having a ridge member on an outer periphery thereof, wherein the relation $P_E > P_{OT}$ is fulfilled, where $P_E$ is a winding pitch at which the ridge member is wound around an overhead transmission line located closer to the earth ground, and $P_{OT}$ is a winding pitch at which the ridge member is wound around another overhead transmission line.

In this multiple-cable power transmission line system, preferably the winding pitches $P_E$ and $P_{OT}$ satisfy the relation $0.5 < P_{OT}/P_E < 1.0$.

According to the first aspect of the invention the outer periphery-to-crest height $L_E$ of the ridge of the overhead transmission line located closer to the earth ground is smaller than the outer periphery-to-crest height $L_{OT}$ of the ridges of the other overhead transmission lines. Consequently, corona discharge scarcely occurs at the ridge of the overhead transmission line located closer to the earth ground.

According to the second aspect of the invention the winding pitch $P_E$ at which the ridge member is wound around the overhead transmission line located closer to the earth ground is greater than the winding pitch $P_{OT}$ at which the ridge member is wound around the other overhead transmission line. For the overhead transmission line located closer to the earth ground, therefore, the number of turns of the ridge member per unit length is small, whereby the frequency of occurrences of corona discharge is lessened.

The above and other objects, features and advantages of the present invention will become more apparent from the following description when taken in conjunction with the accompanying drawings.

DETAILED DESCRIPTION OF THE PREFERRED EMBODIMENTS

A multiple-cable power transmission line system according to the present invention will be hereinafter described in detail with reference to the drawings.

Figure 1:
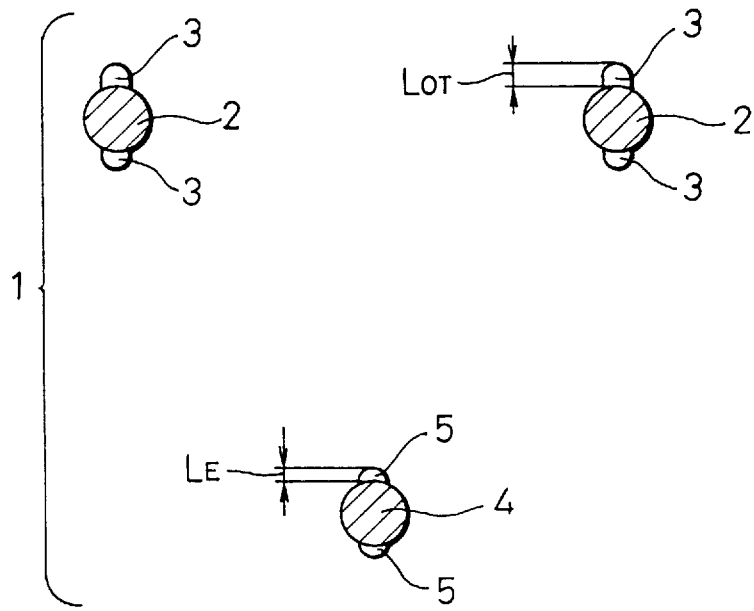
FIG. 1 a sectional view showing a first embodiment according to the present invention.

FIG. 1 illustrates the case where the present invention is applied to an inverted-triangle arrangement of a three-cable power transmission line system 1 in which three overhead transmission lines 2 and 4 are arranged in the form of an inverted triangle.

Each overhead transmission line 2, 4 has a pair of ridges 3, 5 formed on its diametrically opposite sides. The ridges 3, 5 are formed by winding spiral rods of polyamide resin, fluorine-contained resin or the like around the outer periphery of the overhead transmission line 2, 4, or by previously twining ridging wires around the outer periphery of the overhead transmission line 2, 4.

In the three-cable power transmission line system 1 according to this embodiment, the ridges 5 of the overhead transmission line 4 which is located closer to the earth ground have an outer periphery-to-crest height $L_E$ smaller than the outer periphery-to-crest height $L_{OT}$ of the ridges 3 of the other overhead transmission lines 2. Preferably, the outer periphery-to-crest heights $L_E$ and $L_{OT}$ of the ridges 5 and 3 are set to values satisfying the relation of $0.1 < L_E/L_{OT} < 1.0$. If $L_E/L_{OT}$ is smaller than 0.1, corona discharge of the overhead transmission line 4 located closer to the earth ground can be suppressed, but the effect of reducing wind-induced noise cannot be expected. On the other hand, if $L_E/L_{OT}$ is greater than 1.0, the overhead transmission line 4 located closer to the earth ground is undesirably subjected to increased wind pressure and also corona discharge is more likely to occur. Preferably, the ratio of the ridge height $L_E$ to the ridge height $L_{OT}$ is set to a value falling within the range of $0.25 < L_E/L_{OT} < 0.6$.

Each of the overhead transmission lines 2 and 4 comprises several to several tens of wires stranded together, though not clearly shown in FIGS. 1 to 4.

In a multiple-cable power transmission line system constituted by a plurality of overhead transmission lines in general, the outer periphery-to-crest height of the ridges of the individual overhead transmission lines is set to a value most suited to prevent noise induced by wind. In this regard, the three-cable power transmission line system 1 employs an arrangement wherein the ridges 3 of the overhead transmission lines 2 are greater in height than the ridges 5 of the overhead transmission line 4. If the overhead transmission line 2 of which the ridges 3 are greater in height than the ridges 5 is located closer to the earth ground, in place of the overhead transmission line 4, corona discharge occurs at the ridges 3.

By setting the outer periphery-to-crest height $L_E$ of the ridges 5 of the overhead transmission line 4 located closer to the earth ground to a value smaller than the outer periphery-to-crest height $L_{OT}$ of the ridges 3 of the other overhead transmission lines 2, as in this embodiment, it is possible to greatly lessen the corona discharge, though the wind-induced noise can be reduced only slightly.

Figure 2:
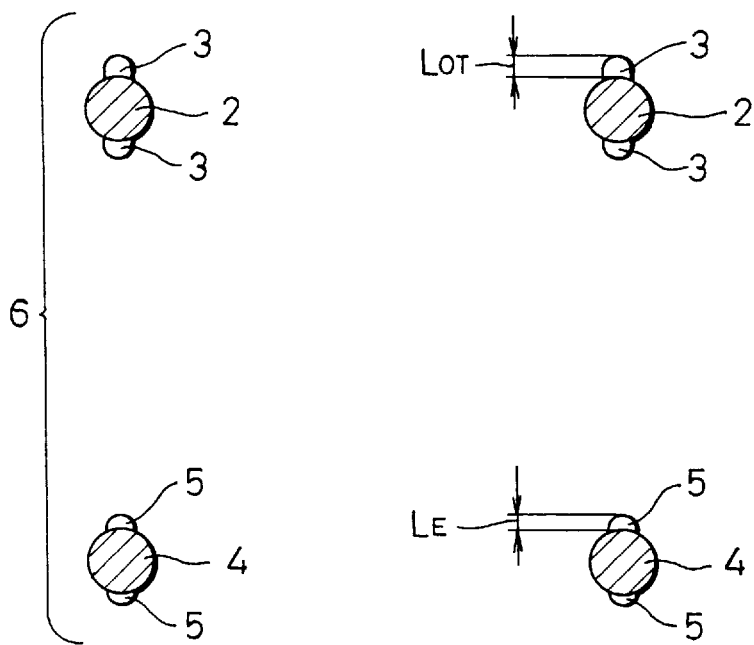
FIG. 2 is a sectional view showing another embodiment of the present invention.

FIG. 2 illustrates the case where the present invention is applied to a four-cable power transmission line system 6. As illustrated, the four-cable power transmission line system 6 has a square or quadrilateral arrangement constituted by a total of four overhead transmission lines 2 and 4, that is, two upper overhead transmission lines 2 and two lower overhead transmission lines 4.

These overhead transmission lines 2 and 4 are identical with the corresponding ones of the overhead transmission lines of the foregoing embodiment in that a pair of ridges 3, 5 are formed on diametrically opposite sides of each overhead transmission line, and that the outer periphery-to-crest height $L_E$ of the ridges 5 of the overhead transmission lines 4 located closer to the earth ground is smaller than the outer periphery-to-crest height $L_{OT}$ of the ridges 3 of the other overhead transmission lines 2.

Figure 3:
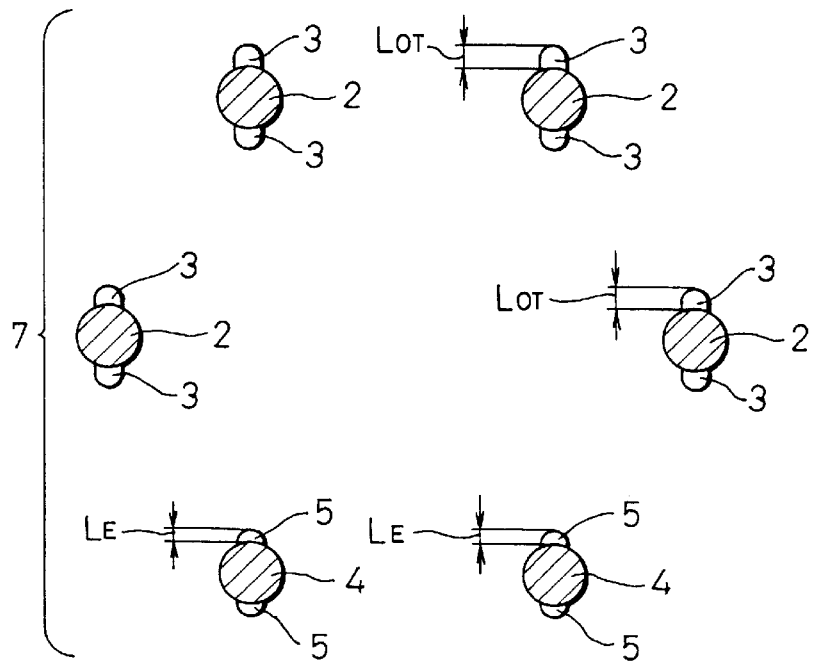
FIG. 3 is a sectional view showing still another embodiment of the present invention.

FIG. 3 illustrates the case where the present invention is applied to a six-cable power transmission line system 7. The six-cable power transmission line system 7 has a hexagonal arrangement constituted by a total of six overhead transmission lines 2 and 4, that is, four overhead transmission lines 2 and two overhead transmission lines 4.

These overhead transmission lines 2 and 4 are identical with the corresponding ones of the overhead transmission lines of the foregoing embodiments in that a pair of ridges 3, 5 are formed on diametrically opposite sides of each overhead transmission line, and that the outer periphery-to-crest height $L_E$ of the ridges 5 of the overhead transmission lines 4 located closest to the earth ground is smaller than the outer periphery-to-crest height $L_{OT}$ of the ridges 3 of the other overhead transmission lines 2.

Figure 4:
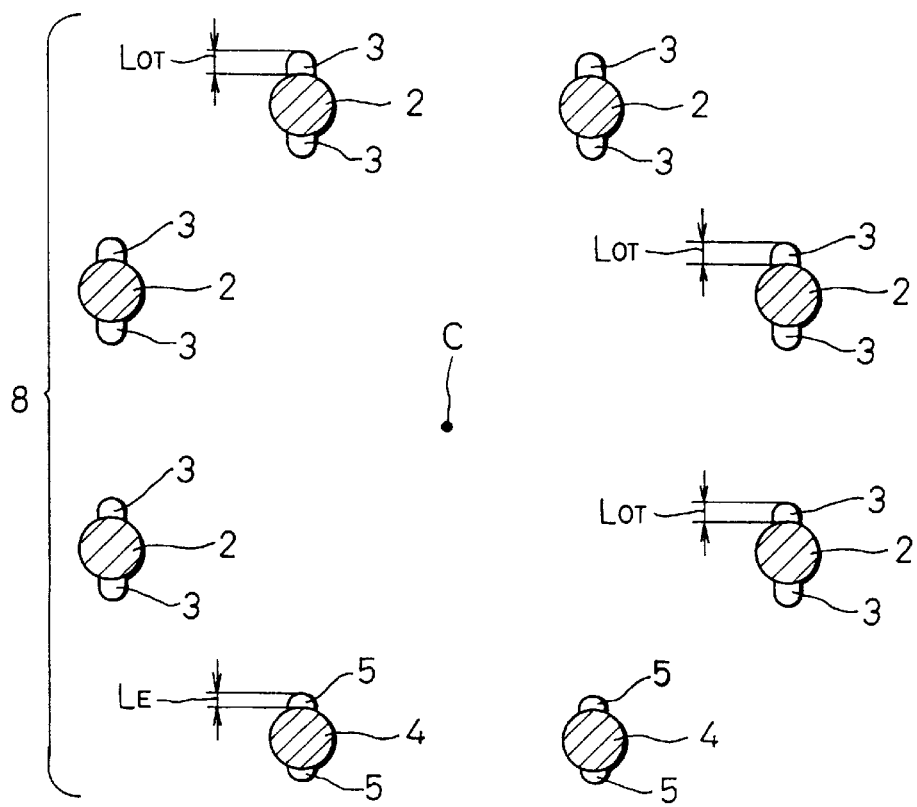
FIG. 4 is a sectional view showing a further embodiment of the present invention.

FIG. 4 illustrates the case where the present invention is applied to an eight-cable power transmission line system 8. The eight-cable power transmission line system 8 has an octagonal arrangement constituted by a total of eight overhead transmission lines 2 and 4, that is, six overhead transmission lines 2 and two overhead transmission lines 4.

These overhead transmission lines 2 and 4 are identical with the corresponding ones of the overhead transmission lines of the foregoing embodiments in that a pair of ridges 3, 5 are formed on diametrically opposite sides of each overhead transmission line, and that the outer periphery-to-crest height $L_E$ of the ridges 5 of the overhead transmission lines 4 located closest to the earth ground is smaller than the outer periphery-to-crest height $L_{OT}$ of the ridges 3 of the other overhead transmission lines 2.

In the case of the eight-cable power transmission line system 8, the outer periphery-to-crest height of the ridges 3 of the two overhead transmission lines 2 which are located at a lower level than center C may of course be set to a value smaller than the outer periphery-to-crest height of the ridges 3 of the other four overhead transmission lines 2 located at a higher level than center C.

Figure 5:
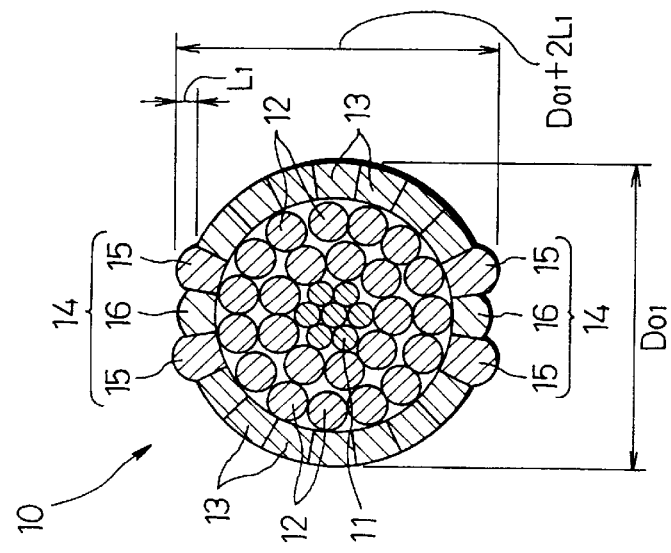
FIG. 5 is a sectional view showing an example of an overhead transmission line used in a multiple-cable power transmission line system of the present invention.

FIG. 5 shows an example; of an overhead transmission line 10 constituting the multiple-cable power transmission line system according to the present invention. The overhead transmission line 10 comprises a steel core 11 having steel wires twisted together, a plurality of aluminum wires 12 twined around the steel core 11, and a plurality of outermost wires 13 twined around the aluminum wires 12. A pair of ridges 14 are interposed between the outermost wires 13 so as to be located on diametrically opposite sides of the outermost layer constituted by the wires 13. Each ridge 14 comprises two large ridging wires 15 and a small ridging wire 16 interposed therebetween.

Figure 7:
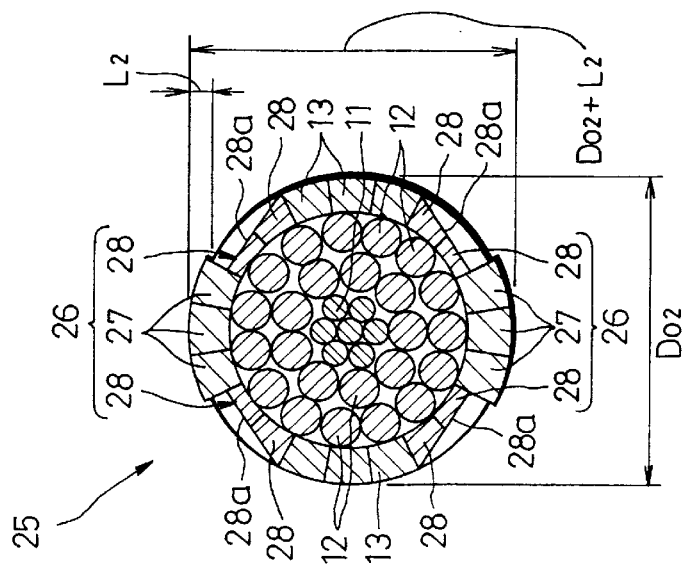
FIG. 7 is a sectional view showing still another example of the overhead transmission line used in the multiple-cable power transmission line system of the present invention.
Figure 6:
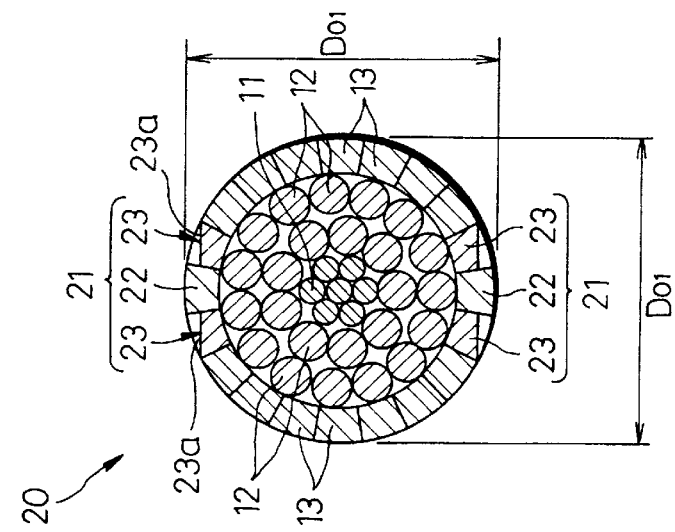
FIG. 6 is a sectional view showing another example of the overhead transmission line used in the multiple-cable power transmission line system of the present invention.

FIGS. 6 and 7 show other examples of the overhead transmission line constituting the multiple-cable power transmission line system according to the present invention. In the following description with reference to FIGS. 6 and 7, identical reference numerals are used to denote identical elements corresponding to those of the overhead transmission line 10 shown in FIG. 5, and detailed description of such elements is omitted.

In overhead transmission lines 20 and 25 shown in FIGS. 6 and 7, ridges 21, 26 are arranged on diametrically opposite sides of a portion of the outermost layer constituted by a plurality of wires 13.

Specifically, in the overhead transmission line 20 shown in FIG. 6, each ridge 21 comprises a ridging wire 22 and two wires 23 arranged on opposite sides, respectively, of the ridging wire 22 and each having a surface 23a parallel to a plane containing the center (axis) of the overhead transmission line 20, and the ridging wires 22 and the wires 23 are twined, together with the outermost wires 13, to form the ridges 21.

In the overhead transmission line 20 of FIG. 6, the ridges 21 are located inside the circular envelope of a cross section of the overhead transmission line 20. Consequently, corona discharge of the overhead transmission line 20 is reduced, thus improving the resistance characteristics to corona discharge, and also the load of wind pressure is small because the wind-receiving area is not increased. Further, the overhead transmission line 20 receives a smaller wind pressure when wind impinges thereupon obliquely, whereby galloping, which is a low-frequency vibration with an amplitude as large as 5 to 10 m, can advantageously be prevented.

In the overhead transmission line 25 shown in FIG. 7, each ridge 26 comprises three ridging wires 27 and two wires 28 arranged on each side of the ridging wires 27 and each having a surface 28a parallel to a plane containing the center (axis) of the overhead transmission line 25, and the ridging wires 27 and the wires 28 are twined, together with the outermost wires 13, to form the ridges 26. The ridges 26 of this overhead transmission line 25 have an outer periphery-to-crest height $L_2$ smaller than a ridge height $L_1$ of the ridging wires 15 of the overhead transmission line 10 shown in FIG. 5 ($L_2 < L_1$).

Figure 8:
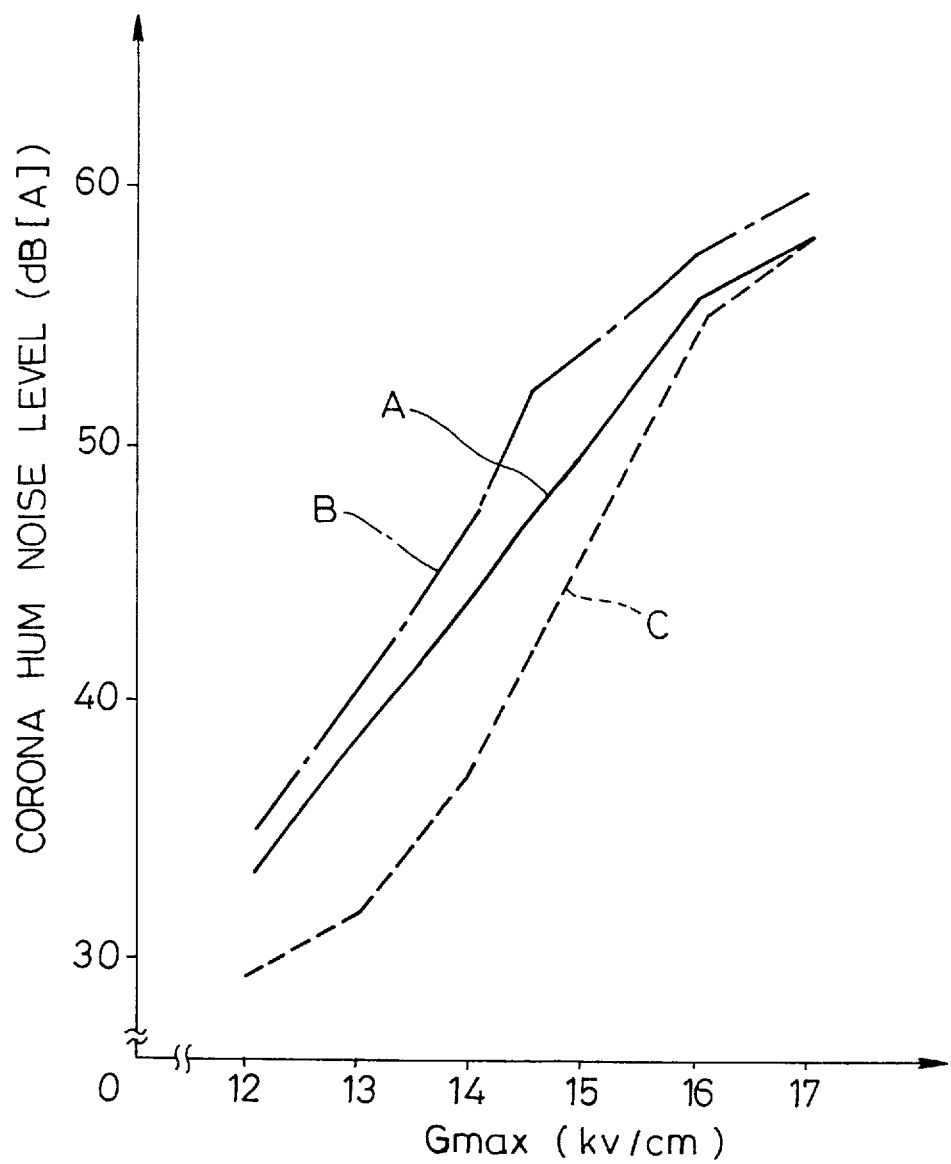
FIG. 8 is a potential gradient characteristic diagram showing the results of measurement of corona hum noise levels observed in the multiple-cable power transmission line system according to the present invention and a conventional multiple-cable power transmission line system.

FIG. 8 is a potential gradient characteristic diagram showing the result of measurement of corona hum noise observed in an eight-cable power transmission line system 8 (FIG. 4) using the overhead transmission lines 10 whose ridging wires 15 have the ridge height $L_1$ as shown in FIG. 5 and the overhead transmission lines 25 whose ridging wires 27 have a smaller ridge height $L_2$ than the ridging wires 15 as shown in FIG. 7.

For the measurement, in the arrangement of the eight-cable power transmission line system 8 shown in FIG. 4, the overhead transmission line 25 shown in FIG. 7 was used for each of the overhead power transmission lines 2, 4 located at a lower level than center C, and the overhead transmission line 10 shown in FIG. 5 was used for each of the overhead transmission lines 2 located at a higher level than center C.

In this case, the ridging wires 15 of each overhead transmission line 10 had an outer periphery-to-crest height $L_1$ of 2.5 mm, each transmission line 10 had an outside diameter $D_{01}$, of 38.4 mm, the ridges 26 of each overhead transmission line 25 had an outer periphery-to-crest height $L_2$ of 1.7 mm, and each overhead transmission line 25 had an outside diameter $D_{02}$ of 38.4 mm. The measurement result is indicated by solid line A in FIG. 8.

For the purpose of comparison, similar measurement was performed on a conventional multiple-cable power transmission line system using only the overhead transmission lines 10 and a multiple-cable power transmission line system using only the overhead transmission lines 20. The measurement results are also shown in FIG. 8.

In FIG. 8, one-dot-chain line B indicates the measurement result obtained by the conventional eight-cable power transmission line system 8 using only the overhead transmission lines 10 shown in FIG. 5, and dashed line C indicates the measurement result obtained by the eight-cable power transmission line system 8 using only the overhead transmission lines 20 shown in FIG. 6. In this case, the overhead transmission lines 10 and 25 used had the same size as mentioned above, and the overhead transmission lines 20 used had an outside diameter $D_{01}$ of 38.4 mm. The overhead transmission line 10 shown in FIG. 5 had a nominal cross-sectional area of 940 mm², the overhead transmission line 20 shown FIG. 6 had a nominal cross-sectional area of 930 mm², and the overhead transmission line 25 shown in FIG. 7 had a cross-sectional area equivalent to 930 mm².

As seen from FIG. 8, with regard to the effect of reducing corona hum noise, the arrangement of the eight-cable power transmission line system 8 (dashed line C) using only the overhead transmission lines 20 of FIG. 6 in which the ridges 21 were located on the circular envelope showed the best result, the arrangement according to the present invention (solid line A) showed the second best result, and the conventional arrangement (one-dot-chain line B) showed the worst result.

With the multiple-cable power transmission line system (solid line A) according to the present invention, the corona hum noise could be reduced by 4 to 10 dB (A) over the range of 14 to 17 (kV/cm) in which the problem of corona hum noise is conspicuous, compared with the conventional multiple-cable power transmission line system (one-dot-chain line B).

Figure 9:
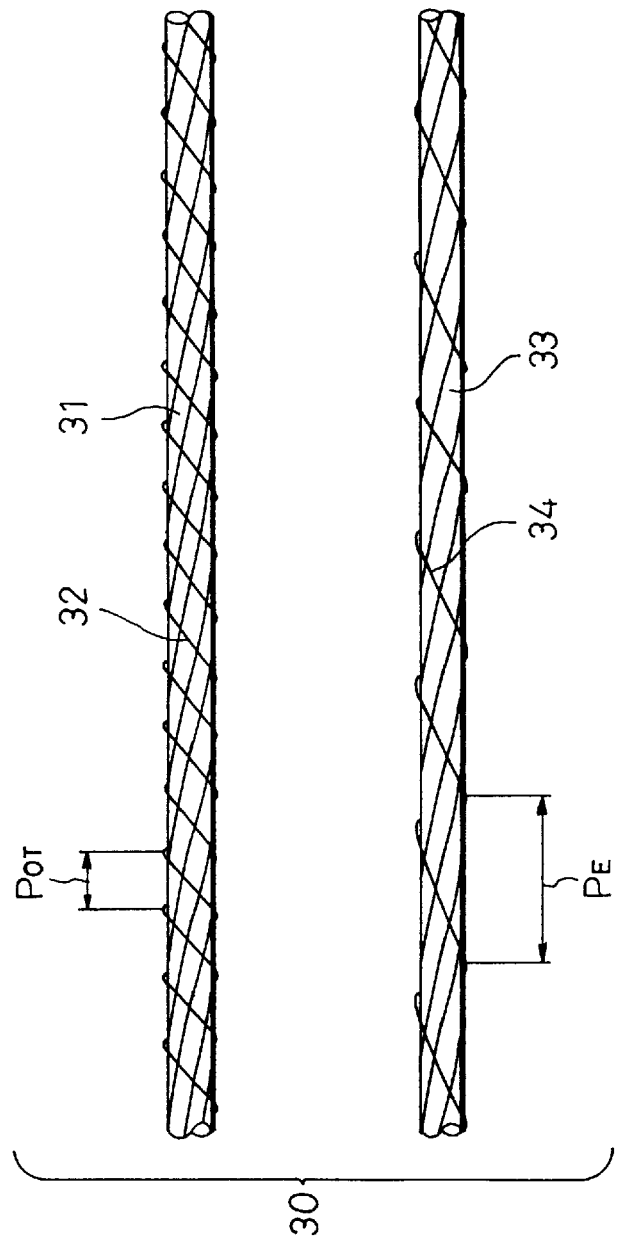
FIG. 9 is a schematic side view of a multiple-cable power transmission line system according to still another embodiment of the present invention.

FIG. 9 illustrates a multiple-cable power transmission line system 30 including two overhead transmission lines 31 and 33 according to another embodiment of the present invention, and this embodiment is characterized in that a winding pitch $P_E$ of a ridge member 34 of the overhead transmission line 33 located closer to the earth ground is greater than a winding pitch $P_{OT}$ of a ridge member 32 of the other or upper overhead transmission line 31. In this case, the heights of the ridge members 32 and 34 need not be the same and may be different from each other.

In this manner, the winding pitch $P_E$ of the ridge member 34 of the overhead transmission line 33 which is located closer to the earth ground is made greater than the winding pitch $P_{OT}$ of the ridge member 32 of the other overhead transmission line 31, so that the number of turns of the ridge member 34 per unit length of the overhead transmission line 33 decreases. Consequently, the frequency of occurrences of corona discharge of the overhead transmission line 33 can be lessened, as compared with the overhead transmission line 31.

In this case, the ridge members 32 and 34 are wound in such a manner that their winding pitches $P_{OT}$ and $P_E$ satisfy the relation of $0.5 < P_{OT}/P_E < 1.0$. If $P_{OT}/P_E$ is smaller than 0.5, the effect of reducing wind-induced noise by the ridge member 34 lessens because the winding pitch $P_E$ of the ridge member 34 is too large, or wind-induced noise is amplified by the ridge member 32 because the winding pitch $P_{OT}$ of the ridge member 32 is too small. On the other hand, if $P_{OT}/P_E$ is greater than 1.0, the effect of reducing wind-induced noise by the ridge member 32 lessens because the winding pitch $P_{OT}$ of the ridge member 32 is too large, or the frequency of occurrences of corona discharge cannot be lessened because the winding pitch $P_E$ of the ridge member 34 is too small. Preferably, the winding pitches $P_{OT}$ and $P_E$ are set to values satisfying the relation of $0.5 < P_{OT}/P_E < 0.7$.

It is to be noted that the shapes of the overhead transmission lines constituting the multiple-cable power transmission line system of the present invention are of course not limited to those explained with reference to the foregoing embodiments.

Also, the winding pitch of the ridge member of an overhead transmission line with a small ridge height may be set to a value greater than that of the ridge member of an overhead transmission line with a large ridge height. With this arrangement, the occurrence of corona discharge of the overhead transmission lines constituting the multiple-cable power transmission line system can be suppressed, making it possible to further improve the characteristics of the overhead transmission lines.

As is clear from the above description, according to the first aspect of the invention the ridges of the overhead transmission line(s) located closer to the earth ground have an outer periphery-to-crest height smaller than that of the ridges of the other overhead transmission lines, whereby the possibility of corona discharge occurring at the ridges can be lessened.

Also, according to the second aspect of the invention the winding pitch of the ridge member of the overhead transmission line which is located closer to the earth ground is greater than that of the ridge member of the other overhead transmission lines. In this case, the number of turns of the ridge member per unit length is decreased, so that the frequency of occurrences of corona discharge can be reduced.

What is claimed is:

1. A multiple-cable power transmission line system including at least first and second overhead transmission lines each having a ridge on an outer periphery thereof, said first overhead transmission line being located closer to earth ground than said second overhead transmission line, wherein:

a relation of $L_E < L_{OT}$ is fulfilled, where $L_E$ is an outer periphery-to-crest height of the ridge of the first overhead transmission line, and $L_{OT}$ is an outer periphery-to-crest height of the ride of the second overhead transmission line.

2. The multiple-cable power transmission line system according to claim 1, wherein the outer periphery-to-crest heights $L_E$ and $L_{OT}$ satisfy a relation of $0.1 < L_E/L_{OT} < 1$.

3. A multiple-cable power transmission line system including at least first and second overhead transmission lines each having a ridge member on an outer periphery thereof, said first overhead transmission line being located closer to earth ground than said second overhead transmission line, wherein:

a relation of $L_E < L_{OT}$ is fulfilled, where $L_E$ is an outer periphery-to-crest height of the ridge member of the first overhead transmission line, and $L_{OT}$ is an outer periphery-to-crest height of the ridge member of the second overhead transmission line; and a relation of $P_E > P_{OT}$ is fulfilled, where $P_E$ is a winding pitch at which the ridge member of the first overhead transmission line is wound around the first overhead transmission line, and $P_{OT}$ is a winding pitch at which the ridge member of the second overhead transmission line is wound around the second overhead transmission line.

4. The multiple-cable power transmission line system according to claim 3, wherein the winding pitches $P_E$ and $P_{OT}$ satisfy a relation of $0.5 < P_{OT}/P_E < 1.0$.

5. The multiple-cable power transmission line system according to claim 3, wherein the outer periphery-to-crest heights $L_E$ and $L_{OT}$ satisfy a relation of $0.1 < L_E/L_{OT} < 1$.

* * * * *